United States Patent

[11] 3,627,912

[72] Inventor William E. Hearn
 Atherton, Calif.
[21] Appl. No. 818,666
[22] Filed Apr. 23, 1969
[45] Patented Dec. 14, 1971
[73] Assignee Charles W. Kieser
 San Francisco, Calif.
 a part interest

[54] VISUAL DISPLAY OF COMPLEX COLOR TELEVISION SOUND WAVE SIGNALS
7 Claims, 4 Drawing Figs.

[52] U.S. Cl. ..................................... 178/5.4 R,
 179/1 VS
[51] Int. Cl. ...................................... H04n 9/02
[50] Field of Search .......................... 178/5.4;
 179/1 V; 84/1.18 CR, 1.12, 1.21, 1.22; 315/23;
 343/5

[56] References Cited
UNITED STATES PATENTS
3,175,121 3/1965 Birnbaum ..................... 315/23
2,275,283 3/1942 Burchfield .................... 179/1
2,804,500 8/1957 Giacolletto ................... 178/5.4
2,989,582 6/1961 Zworykin et al. ............. 168/5.4
3,175,121 3/1965 Birnbaum et al. ............ 315/23
3,307,142 2/1967 Doebler ........................ 343/5

Primary Examiner—Richard Murray
Assistant Examiner—P. M. Pecori
Attorney—Flehr, Hohbach, Test, Albritton & Herbert ABSTRACT: This disclosure involves apparatus and modifying circuits for use in conjunction with a conventional color cathode-ray tube to provide fanciful wide-band vector representations of the video signals by a pair of audio channels such, for example, as would be produced with a stereophonic recorded-signal source. The stereophonic signal source may be generated through microphones, phonograph and magnetic tape recordings, or from stereophonic broadcasts and is amplified and processed by wide-band linear circuitry whose effect is substantially independent of frequency and displayed in vector form on a color cathode-ray tube utilizing magnetic deflection. The effect of the apparatus is to produce highly detailed visual patterns of great regularity and beauty of form and color, revealing fine details inherent in the stereophonic representation of the complex, nonrecurrent wave forms produced by music or voice. No filters or frequency sensitive elements are used except as required to enhance the signal-to-noise ratio of the program material in which no timing signal, sweep signal, or raster representation is employed.

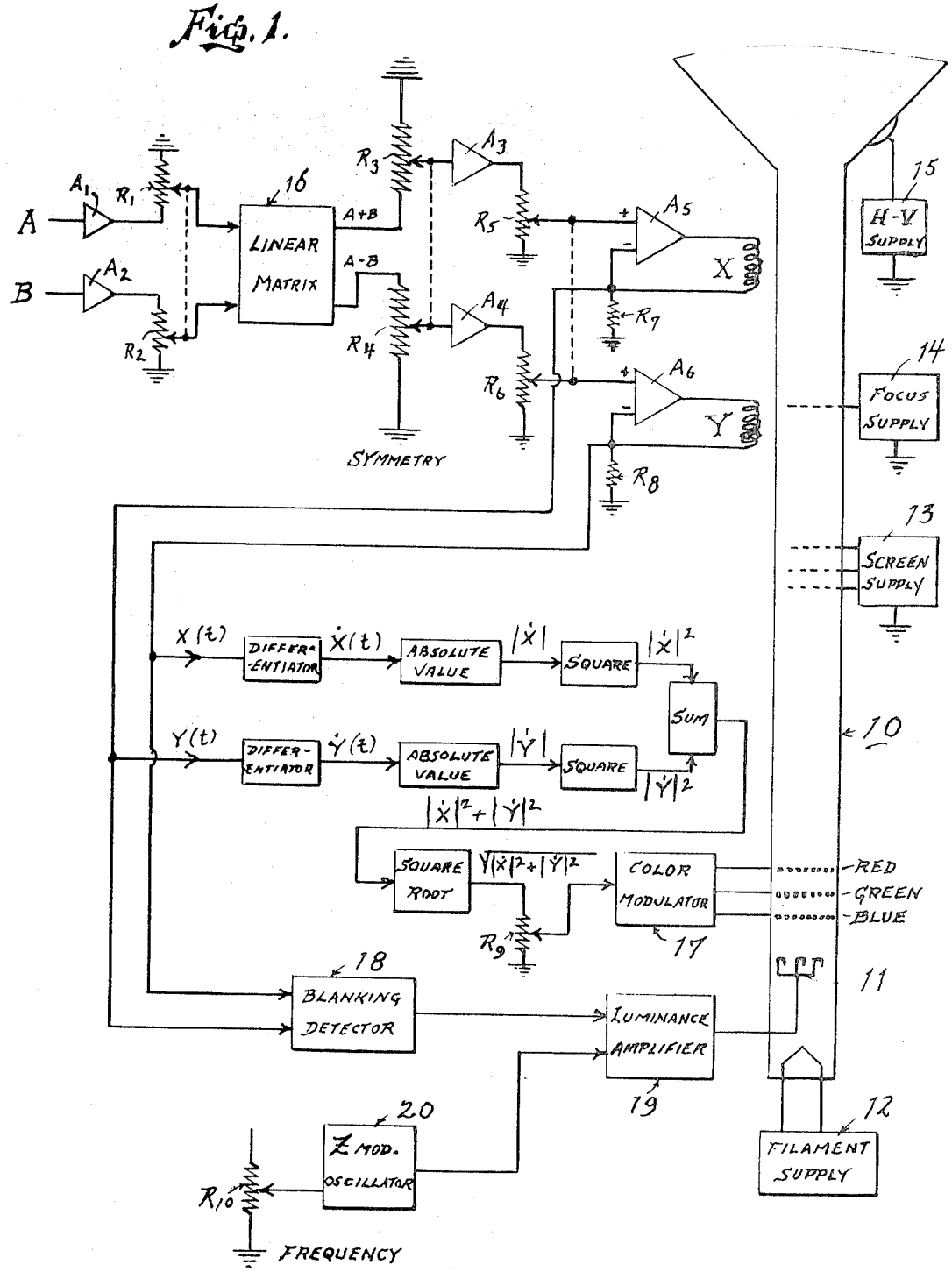

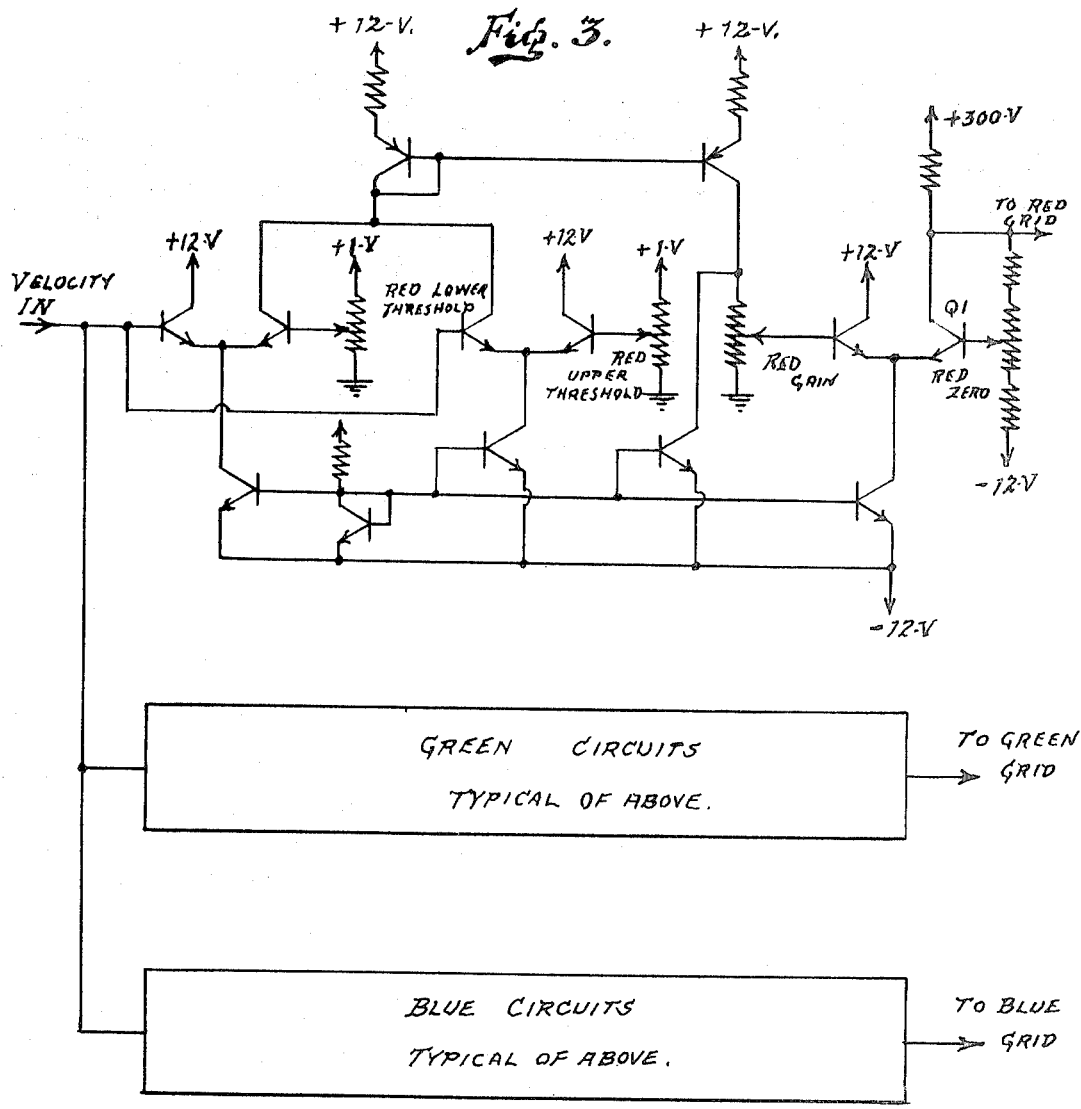
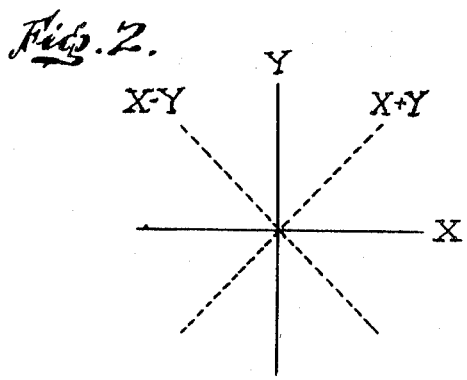
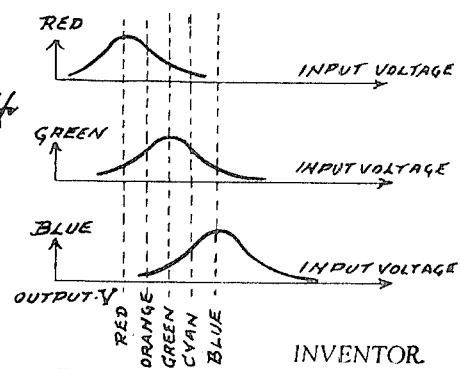
INVENTOR.
WILLIAM E. HEARN.

VISUAL DISPLAY OF COMPLEX COLOR TELEVISION SOUND WAVE SIGNALS

A primary object of the invention is to provide apparatus and a system of control for a color cathode-ray tube by which a fanciful wide-band vector representation in color of the video signals produced by the audio channels of a stereophonic recorded signal source is obtained.

Another object of the invention is to provide a modifying circuitry for a CRT which analyzes the apparently resultant velocity of the trace upon a color TV screen with instantaneous Z modulation of the color of the trace throughout a broad spectrum of color as a linear function of the trace velocity.

I am aware of U. S. Pat. No. 2,500,646 to Riesz, dated Mar. 14, 1950, which is primarily concerned with black and white signals and, while this patent proposes apparatus in some respects similar to the present invention, its operation depends upon the assumption that the input material is from a single channel which contains stable frequency information.

A somewhat similar proposal for black and white reproduction is found in U.S. Pat. No. 3,175,121 to Birnbaum, issued Mar. 23, 1965, which proposes apparatus to provide for the display of rosette patterns. This patent depends for operation upon two sine-wave generators, harmonically related, whereas in accordance with this invention no such related wave generators are required.

It is further object of my invention to provide apparatus and circuitry differing from the above prior art by which a fanciful wide-band vector representation in color of the video signals is produced by a stereophonic signal source.

Other objects and advantages will be in part evident to those skilled in the art and in part pointed out hereinafter in the following description taken in connection with the accompanying drawings wherein there is shown by way of illustration and not of limitation a preferred embodiment of the invention. In the accompanying drawings:

FIG. 1 is a schematic diagram showing the invention as applied to a conventional CRT tube, FIG. 2 is a diagram showing the X- and Y-axes of a display as contemplated by the invention, FIG. 3 is a further diagrammatic showing of the circuits employed in the color modulator as employed in accordance with the invention, and FIG. 4 shows the input voltage curves as related to the different colors of the spectrum.

For a detailed description of the invention reference is now made to FIG. 1 of the accompanying drawings wherein there is diagrammatically shown a conventional color cathode-ray tube 10 having cathodes 11, a filament supply 12, screen supply source 13, a focus supply 14 and a high-voltage supply 15 for the screen. In this showing deflection coils X and Y are shown as included in a circuit connected to input channels A and B. As here shown, the input channels A and B are buffered by amplifiers $A_1$ and $A_2$ and applied to dual-control resistances $R_1$ and $R_2$, which consists of two counterrotating potentiometers that provide a balancing of the input channels A and B. The outputs of dual-control resistances $R_1$ and $R_2$ are matrixed by a linear matrix 16 which accepts the input signal voltages of channels A and B on its two input terminals and produces at its two outputs the output signal voltages A+B and A−B. These two output signals may be termed the "sum" and "difference" signals respectively. Dual control resistances $R_3$ and $R_4$ consist of two counterrotating potentiometers which provide for a balancing of the sum and difference signals. The output of this control is buffered by amplifiers $A_3$ and $A_4$ and applied to dual controls $R_5$ and $R_6$, which also consist of two potentiometers that rotate in step and provide for varying the signal level input to the two deflection amplifiers $A_5$ and $A_6$. Amplifiers $A_1$, $A_2$, $A_3$ and $A_4$ are voltage amplifiers having high-input impedance and low-output impedance. This means that they do not appreciably load the circuit which drives them and they present a very firm voltage source when driving other circuits. It is the function of $A_5$, in combination with its feedback resistor $R_7$ to provide a signal current in the X-deflection yoke which is directly proportional to the input signal voltage. Likewise, the function of $A_6$ with its feedback resistor $R_8$ provides a signal current in the Y-deflection yoke which is also proportional to the input signal voltage. This ensures that the electron beam will be deflected proportionally to the input voltage. The amplifiers $A_5$ and $A_6$ are power amplifiers with differential inputs and large voltage gain, and are typically capable of delivering at least 1 ampere of signal current into a 10 ohm load and are connected in a potentiometric feedback configuration to ensure constant current operation.

It is seen that by means of the above arrangement full control may be exercised over the average $x+y/x-y$ ratio of the patterns displayed by means of dual control $R_1$ and $R_2$, while full control may be exercised over the average $x/y$ ratio of the patterns displayed by dual control $R_3$ and $R_4$, and full control may be obtained over the average size of the patterns displayed by dual control $R_5$ and $R_6$. A feature of this arrangement is that it allows for correction of program material which may be deficient in separation as well as in balance and therefore provides a means of adjusting for symmetrical distribution of the patterns displayed along the $x+y/x-y$ axes as well as along the $x/y$ axes. The signals developed at the output of dual control $R_5$ and $R_6$ are amplified and applied to the color cathode-ray tube X- and Y-deflection coils by means of deflection amplifiers $A_5$ and $A_6$ which linearly amplify the input signal and provide for an exactly proportional relationship between the X-amplifier input signal and the X-displacement of the trace upon the screen, and a similarly proportional relationship between the Y-amplifier input signal and the Y-displacement of the trace upon the screen. Deflection amplifiers $A_5$ and $A_6$ provide for this proportional relationship over the full range of frequencies of interest so that the configuration of the pattern produced in independent of the frequency, if any, of the program material. The circuitry which provides the Z-modulation for the trace color is also shown in FIG. 1 of the drawings and operates as follows: Let the position of the trace upon the screen be defined as a function of time by the relationship, $$x = X(t) \quad y = Y(t)$$

where the center of the CRT screen is assumed to be at $X=0$, $Y=0$.

With this it will be seen that, in the circuitry shown, the magnitude of velocity of the trace is given by $$|V| = \sqrt{V_x^2 + V_y^2}$$

where $$V_x = |\dot{X}(t)|$$

and $$V_y = |\dot{Y}(t)|$$

A signal proportional to the above velocity magnitude $V$ is used to modulate the trace color. The effect of the circuitry is to cause the patterns displayed to be multicolored. In displaying any given pattern, the trace velocity may go through a velocity variation in excess of two orders of magnitude. The circuitry will cause the trace to have a red hue at lower velocities, changing to orange as the velocity increases, and changing through yellow, green, blue, violet and intermediate special colors with further increases in velocity.

The color modulator is designed to provide varying amounts of drive to the red, green and blue grids of the tricolor CRT so as to accomplish the above relationships. The embodiment of the circuitry of the color modulator is shown in FIG. 3. This modulator has for its input signal the velocity signal derived by means of performing the following operations on the displacement signals $X(t)$ and $Y(t)$ which are the drive signals to the deflection amplifiers $A_5$ and $A_6$.

1. Differentiate $X(t)$, $Y(t)$ to get $\dot{X}(t)$, $\dot{Y}(t)$
2. Take absolute value of $\dot{X}(t)$ and $\dot{Y}(t)$ to get $|\dot{X}(t)|$ and $|\dot{Y}(t)|$
3. Square $|\dot{X}(t)|$ and $|\dot{Y}(t)|$ to get $|\dot{X}(t)|^2$ and $|\dot{Y}(t)|^2$
4. Take the sum of $|\dot{X}(t)|^2$ and $|\dot{Y}(t)|^2$ to get $|\dot{X}(t)|^2 + |\dot{Y}(t)|^2$
5. Take the square root of $|\dot{X}(t)|^2 + |\dot{Y}(t)|^2$ to get $\sqrt{\dot{X}(t)^2 + \dot{Y}(t)^2}$ as indicated on the drawing.

Other novel elements of the display are the blanking detector 18, the luminance amplifier 19, and Z modulation oscillator 20. The blanking detector 18 examines the signal current in the deflection yoke which is proportional to the displacement of the trace upon the screen and generates an electrical signal which causes the electron beam intensity to decrease to the black level when the beam is not being deflected and is occupying the center of the screen. Decreasing the beam intensity in this way prevents the phosphor at the center of the CRT from being burned by the continuous application of the high-intensity electron beam.

The purpose of the Z modulation oscillator 20 is to generate a signal of relatively high frequency (on the order of 100 kHz.) which is used to continuously modulate the electron beam intensity. This has the effect of giving a dotted quality to the display, increasing the ease with which certain patterns may be distinguished. The color modulator circuit accepts at its input a voltage which is proportional to the velocity of the trace upon the screen. From this input signal it must generate three output voltages, a red, a green and a blue voltage which are used to drive the control grids of the color cathode-ray tube. Ideally this circuit will generate these three output voltages in such a way that the proportions of red, green and blue vary so as to produce a resultant trace color which changes through the whole spectrum as the input voltage (proportional to trace velocity) varies from zero to some maximum value.

Preceding this, the function of the differentiators is to accept the input signal voltages which are proportional to the displacement of the trace upon the screen and to produce at their output a velocity signal which is proportional to the time derivative of the input signal voltages and thus is also proportional to the time derivative of the beam displacement or velocity.

The absolute value circuit accepts the input voltage which is proportional to the velocity of the trace upon the screen and generates at its output a voltage equal in magnitude to that of the input, but having only a single polarity. For example, if the input voltage goes ± 1 volt above and below ground, indicating that the beam is moving at positive and negative velocities, the absolute value circuit will generate + 1 volt in each case. Note that the direction of motion is unimportant, but the magnitude is to be used to modulate the color.

It is the function of the square circuit to accept the input voltage which is proportional to the magnitude of the velocity of the trace upon the screen and to generate at its output a voltage which is proportional to the square of this input voltage and hence is proportional to the square of the velocity of the trace upon the screen.

The function of the summing circuit is to add the two input voltages and produce at the output a voltage equal to the sum of the two input voltages.

It is the function of the square root circuit to generate at its output a voltage equal to the square root of the voltage present at the input. It is seen that the signal developed by means of the above procedure is exactly proportional to the velocity of the trace upon the screen. Control $R_0$ is used to adjust the velocity signal which is applied to the color modulator 17.

The color modulator 17 circuit accepts at its input a voltage which is proportional to the velocity of the trace upon the screen. From this input signal it must generate three output voltages: a red, a green and a blue voltage which are used to drive the control grids of the color cathode-ray tube. Ideally this circuit will generate these three output voltages in such a way that the proportions of red, green and blue vary so as to produce a resultant trace color which changes through the whole spectrum as the input voltage (proportional to trace velocity) varies from zero to some maximum value.

In the circuit shown in FIG. 3, the three color output voltages are generated by three identical circuits, each of which is set to be sensitive to a slightly different range of input voltages. This can be shown graphically by the three output vs. input curves as shown in FIG. 4.

The function of the blanking detector is to examine the displacement signals $x(t)$ and $y(t)$ and produce an output signal only when $x(t)$ and $y(t)$ have been zero for some length of time; i.e., when the trace is stationary at the center of the screen and the phosphor is in danger of being burned by the high-intensity beam. This output signal will be used to shut off the beam to avoid burning the center of the color CRT screen.

The Z modulation oscillator 20 circuit turns the beam on and off at a very rapid rate which lends a "grainy" or "dotted" quality to the display. This is done for purely esthetic reasons. It appears to enhance the patterns produced. The luminance amplifier 19 is a simple video amplifier of the type often used in TV sets. It reacts to the input voltages from the blanking detector and Z-modulation oscillator by modulating the cathode current of the CRT.

While I have shown and described a single embodiment it will be apparent that many changes may be made in the apparatus without changing the essential features of my invention; for example, the deflection amplifiers need not be operated by means of constant current feedback as shown in FIG. 1, but may be operated as voltage sources if properly equalized to obtain constant current operation. Also, the three red, green and blue color signals used to drive the grids of the tricolor CRT may be derived by means of different circuitry and still give a similar effect; for example, in place of the velocity modulation used to develop the three color signals, the audio spectrum may be split into three bands and the energy in each band may be detected and used to generate the three red, green and blue color signals.

Although I have shown and described a certain specific embodiment of my invention, I am fully aware that many modifications thereof are possible. My intention, therefore, is not to be restricted except insofar as is necessitated by the prior art and the spirit of the appended claims.

Having thus described my invention, what I claim and desire to secure by Letters Patent is:

1. Apparatus utilizing a color cathode-ray tube (CRT) having X- and Y-deflection means and three color grid means to provide a colored screen pattern of the information contained in two stereophonic input signals comprising: first means responsive to said two input signals for driving said X and Y means and providing a CRT beam displacement proportional to said two input signals; and second means responsive to said two input signals for providing a modulation signal proportional to the velocity of said beam displacement for driving said grid means.

2. Apparatus as in claim 1 where said second means includes modulating means responsive to three different but overlapping ranges of said modulation signal to produce three color grid control voltages.

3. Apparatus as in claim 1 where said first means includes means for matrixing said two input signals.

4. Apparatus as in claim 3 where said second means is responsive to said matrixed signals.

5. Apparatus as in claim 3 where said matrixing means includes means for balancing said two input signals.

6. Apparatus as in claim 1 where said second means includes analog circuit means for causing said modulation signal to be proportional to the absolute velocity of said beam displacement.

7. Apparatus as in claim 6 where said analog circuit means includes means for differentiating said input signals, taking the absolute value of such differentiated signals, squaring said absolute values, summing said squared values, and taking the square root of said sum, said square root signal being said modulation signal.

* * * * *